US011985628B2

(12) United States Patent
Sambale et al.

(10) Patent No.: US 11,985,628 B2
(45) Date of Patent: May 14, 2024

(54) VEHICLE TERMINALS, AND METHOD FOR OPERATING VEHICLE TERMINALS TO MONITOR WIRELESS RESOURCES

(71) Applicant: Robert Bosch GmbH, Stuttgart (DE)

(72) Inventors: Klaus Sambale, Oberhausen (DE); Nadia Brahmi, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 336 days.

(21) Appl. No.: 17/277,045

(22) PCT Filed: Jul. 16, 2019

(86) PCT No.: PCT/EP2019/069083
§ 371 (c)(1),
(2) Date: Mar. 17, 2021

(87) PCT Pub. No.: WO2020/057804
PCT Pub. Date: Mar. 26, 2020

(65) Prior Publication Data
US 2022/0039063 A1 Feb. 3, 2022

(30) Foreign Application Priority Data
Sep. 20, 2018 (DE) .................... 10 2018 216 053.8

(51) Int. Cl.
H04W 72/02 (2009.01)
H04W 4/48 (2018.01)
(Continued)

(52) U.S. Cl.
CPC ............. H04W 72/02 (2013.01); H04W 4/48 (2018.02); H04W 72/20 (2023.01); H04W 72/56 (2023.01)

(58) Field of Classification Search
CPC ....... H04W 72/02; H04W 4/48; H04W 72/56; H04W 72/20
See application file for complete search history.

(56) References Cited

U.S. PATENT DOCUMENTS

2015/0215903 A1  7/2015  Zhao et al.
2016/0295624 A1  10/2016  Novlan et al.
(Continued)

FOREIGN PATENT DOCUMENTS

CN    107852697 A    3/2018
WO    2018055813 A1  3/2018

OTHER PUBLICATIONS

Translation of International Search Report for Application No. PCT/EP2019/069083 dated Oct. 8, 2019 (2 pages).

(Continued)

Primary Examiner — Won Tae C Kim
(74) Attorney, Agent, or Firm — Michael Best & Friedrich LLP

(57) ABSTRACT

The invention relates to a method for operating a first vehicle terminal (NN1; NN2, NN3; NN4) for a wireless communications network, the method comprising: determining a resource pattern within a resource pool, the resource pattern comprising a plurality of wireless resources of a data channel within the resource pool; and sending, on a control channel, an item of control information which indicates the resource pattern and a group of at least two vehicle terminals associated with the resource pattern.

13 Claims, 5 Drawing Sheets

(51) Int. Cl.
*H04W 72/20* (2023.01)
*H04W 72/56* (2023.01)

(56) References Cited

U.S. PATENT DOCUMENTS

| | | | |
|---|---|---|---|
| 2017/0086081 A1 | 3/2017 | Kim et al. | |
| 2017/0289733 A1 | 10/2017 | Rajagopal et al. | |
| 2018/0206073 A1 | 7/2018 | Wang et al. | |
| 2019/0182890 A1* | 6/2019 | Jeong | H04W 4/40 |
| 2020/0092685 A1* | 3/2020 | Fehrenbach | H04W 72/23 |
| 2021/0051628 A1* | 2/2021 | Zhang | H04W 72/121 |
| 2021/0219320 A1* | 7/2021 | Belleschi | H04W 72/20 |
| 2021/0266921 A1* | 8/2021 | Wang | H04B 17/318 |

OTHER PUBLICATIONS

AT&T, "V2X Sidelink Design in Supporting unicast, groupcast and broadcast", 3GPP TSG RAN WG1 Meeting #94, <http://www.3gpp.org/ftp/tsg%5Fran/WG1%5FRL1/TSGR1%5F94/DOcs/R1%2D1809066%2Ezip>, retrieved from the Internet Aug. 11, 2018 (5 pages).
Institute for Information Industry (III), "Resource Pool Configuration and Transmission for Partial Coverage," R2-140687, 3GPP TSG-RAN WG2 #85, Feb. 2014 (3 pages).
ZTE, "Resource Allocation of D2D Communication," R1-134308, 3GPP TSG-RAN WG1 Meeting #74bis, Oct. 2013 (6 pages).

* cited by examiner

VEHICLE TERMINALS, AND METHOD FOR OPERATING VEHICLE TERMINALS TO MONITOR WIRELESS RESOURCES

BACKGROUND OF THE INVENTION

The present invention relates to a first in-vehicle terminal device, a method for operating a first in-vehicle terminal device, a second in-vehicle terminal device, and a method for operating a second in-vehicle terminal device.

SUMMARY OF THE INVENTION

A first aspect of this description relates to a first in-vehicle terminal device for a radio communication network, wherein the first in-vehicle terminal device comprises at least one processor, at least one memory comprising computer program code, at least one communication module, and at least one antenna, wherein the computer program code is configured in such a way that, via the at least one processor, the at least one communication module, and the at least one antenna, it causes the first in-vehicle terminal device to determine a resource pattern within a resource pool, wherein the resource pattern comprises a plurality of radio resources of a data channel within the resource pool; and to transmit an item of control information that indexes the resource pattern and a group of at least two in-vehicle terminal devices associated with the resource pattern, on a control channel.

Advantageously, a plurality of radio resources within a resource pool is thereby reserved as a respective transmission opportunity exclusively for the group of at least two terminal devices. In addition, decentralized coordination of the group-related use of the radio resources is achieved by means of the determination of the resource pattern by the terminal device. By means of this decentralized reservation method, the probability of collision on the radio resources of the selected resource pattern is reduced and allows messages to be delivered within a given time window. As a result, the reliability of communication for applications relating to a plurality of motor vehicles is improved, and is not dependent on the availability of a base station.

Advantageously, the radio resources can be used in a group-specific manner. For example, the radio resources of the resource pattern in a platoon can be in the driving order of the motor vehicles.

Due to the reduced probability of collision, time-critical applications within the group benefit from at least two terminal devices. These time-critical applications relate to driving maneuvers that must be coordinated by means of a time-critical message exchange among the vehicles. Thus, for example, vehicles driving in a platoon and exchanging messages according to a hop-by-hop method can reserve a resource pattern exclusively, for example, in order to coordinate and safely initiate platoon-wide braking. In another example, a group is formed for a lane-change maneuver, and the vehicles coordinate their respective braking and steering maneuvers with one another using corresponding time-critical messages.

One advantageous example is characterized in that the first in-vehicle terminal device: determines potentially usable radio resources for the group of at least two in-vehicle terminal devices, said resources representing potential transmission opportunities within the radio resources of the data channel indexed by the resource pool; and determines the resource pattern from the plurality of potentially usable radio resources. Advantageously, potential transmission opportunities are identified on the data channel in order to determine the resource pattern as a subset of these potential transmission opportunities.

One advantageous example is characterized in that the first in-vehicle terminal device: receives a different item of control information that indexes a further resource pattern and a group of at least two terminal devices associated with the further resource pattern, on the control channel, wherein the further resource pattern comprises a plurality of further radio resources of the data channel within the resource pool; and determines the plurality of the potentially usable radio resources as a function of the further resource pattern, wherein the plurality of potentially usable radio resources is not included in the further resource pattern. Advantageously, the radio resources used by other groups of in-vehicle terminal devices are excluded when determining the potentially usable radio resources. Therefore, decentralized coordination of the use of the radio resources is provided.

One advantageous example is characterized in that the first in-vehicle terminal device: determines a respective occupancy status of the radio resources of the resource pool; determines the plurality of potentially usable radio resources as a function of the determined occupancy statuses, wherein the plurality of potentially usable radio resources is not occupied by other in-vehicle terminal devices. Advantageously, by determining the occupancy status of the respective radio resources, the periodicity of the data traffic between in-vehicle terminal devices is utilized in order to identify the potentially usable radio resources as a function of an occupancy pattern.

One advantageous example is characterized in that the first in-vehicle terminal device: determines a respective priority of radio resources of the resource pool that are used; determines the plurality of potentially usable radio resources as a function of the determined priorities, wherein the plurality of potentially usable radio resources comprises those radio resources of which the determined priority falls below a priority threshold. Advantageously, radio resources that were previously occupied by low-priority traffic are thus reserved for group communication. Communication in the group of at least two terminal devices is thus improved. For example, the plurality of potentially usable radio resources also comprises, inter alia, those radio resources of which the determined priority falls below a priority threshold. Of course, other mechanisms may also be used for determining low-priority traffic or low-priority radio resources.

One advantageous example is characterized in that the first in-vehicle terminal device: determines a new resource pattern within the resource pool, wherein the new resource pattern comprises a plurality of radio resources of the data channel within the resource pool; and transmits a new item of control information, which indexes the new resource pattern, a group of at least two in-vehicle terminal devices associated with the new resource pattern, and a time at which the new resource pattern becomes effective, on the control channel. The new resource pattern is, for example, determined when the group size changes. In another example, the new resource pattern is determined in order to improve the distribution of the radio resources occupied for group communication. Other examples comprise the random or periodic renewal of the resource pattern. Advantageously, the resource pattern is announced on the control channel by means of the indication of the time at which it takes effect, so that other terminal devices that want to send low-priority traffic on the data channel refrain from using the radio resources of the new resource pattern.

One advantageous example is characterized in that the first in-vehicle terminal device: determines an absence of a reception of further control information that indexes the determined resource pattern and the group of at least two in-vehicle terminal devices associated with the determined resource pattern; determines a further new resource pattern within the resource pool as a function of the determined absence, wherein the further new resource pattern comprises a plurality of radio resources of the data channel within the resource pool; and transmits a further new item of control information on the control channel that comprises the further new resource pattern and the group of at least two in-vehicle terminal devices associated with the new resource pattern. Advantageously, the first in-vehicle terminal device recognizes that a collision has occurred on the data channel via the absence of control information, which essentially constitutes a copy of the control information transmitted by the first terminal device. Said collision is resolved by means of the determination and propagation of the further new resource pattern.

A second aspect of the present description relates to a method for operating a first in-vehicle terminal device for a radio communication network, wherein the method comprises: determining a resource pattern within a resource pool, wherein the resource pattern comprises a plurality of radio resources of a data channel within the resource pool; and transmitting an item of control information that indexes the resource pattern and a group of at least two in-vehicle terminal devices associated with the resource pattern, on a control channel.

A third aspect of the present description relates to a second in-vehicle terminal device for a radio communication network, wherein the second in-vehicle terminal device comprises at least one processor, at least one memory comprising computer program code, at least one communication module, and at least one antenna, wherein the computer program code is configured in such a way that, via the at least one processor, the at least one communication module, and the at least one antenna, it causes the second in-vehicle terminal device: to receive an item of control information that indexes a resource pattern and a group of at least two in-vehicle terminal devices associated with the resource pattern, on a control channel, wherein the resource pattern comprises a plurality of radio resources of a data channel within the resource pool; to determine a group membership of the second terminal device in the group of at least two terminal devices; and to transmit data on the data channel via at least one of the radio resources of the received resource pattern, as a function of the determined group membership. Advantageously, the second in-vehicle terminal device uses the radio resources of the received resource pattern only if the second terminal device is part of the group of at least two terminal devices. However, if the second terminal device is not part of the group, the second terminal device does not transmit on the radio resources of the received resource pattern.

One advantageous example is characterized in that the second in-vehicle terminal device: determines that the second in-vehicle terminal device is part of the group of at least two in-vehicle terminal devices, and as a function thereof; transmits another item of control information that indexes the received resource pattern and the group of at least two in-vehicle terminal devices associated with the received resource pattern, on the control channel. Advantageously, the resource pattern is thus propagated via the control channel using the reserved radio resources. The repetition of the control information within the group increases the probability of propagating the information. In particular, each terminal device of the group is thus reached, and the terminal devices that do not belong to the group and that are near the group are informed via the non-use of the reserved radio resources.

One advantageous example is characterized in that the second in-vehicle terminal device is associated with the group of at least two terminal devices, and wherein the second in-vehicle terminal device: determines a collision on a radio resource of the resource pattern; stops transmission of the other control information as a function of the determined collision. Advantageously, on the one hand, the resource pattern is not propagated within the group. On the other hand, by means of the absence of the control information, it is signaled to the terminal device determining the resource pattern that a new resource pattern must be determined due to the detected collision. As a result, rapid collision resolution is provided for non-centrally scheduled terminal devices.

One advantageous example is characterized in that the second in-vehicle terminal device: transmits an additional item of control information that indexes radio resources used by the second in-vehicle terminal device, wherein the radio resources used by the second in-vehicle terminal device have a lower priority than the radio resources of the resource pattern; determines that the second in-vehicle terminal device is not part of the group of at least two in-vehicle terminal devices, and that a portion of the radio resources used by the second terminal device having lower priority is included in the resource pattern, and as a function thereof, does not use the portion of the radio resources used by the second terminal device having lower priority, which are not included in the resource pattern.

A fourth aspect of the present description relates to a method for operating a second in-vehicle terminal device for a radio communication network, wherein the method comprises: receiving an item of control information that indexes a resource pattern and a group of at least two in-vehicle terminal devices associated with the resource pattern, on a control channel, wherein the resource pattern comprises a plurality of radio resources of a data channel within the resource pool; determining a group membership of the second terminal device in the group of at least two terminal devices; and transmitting data on the data channel via at least one of the radio resources of the received resource pattern, as a function of the determined group membership.

DETAILED DESCRIPTION

Figure 1:
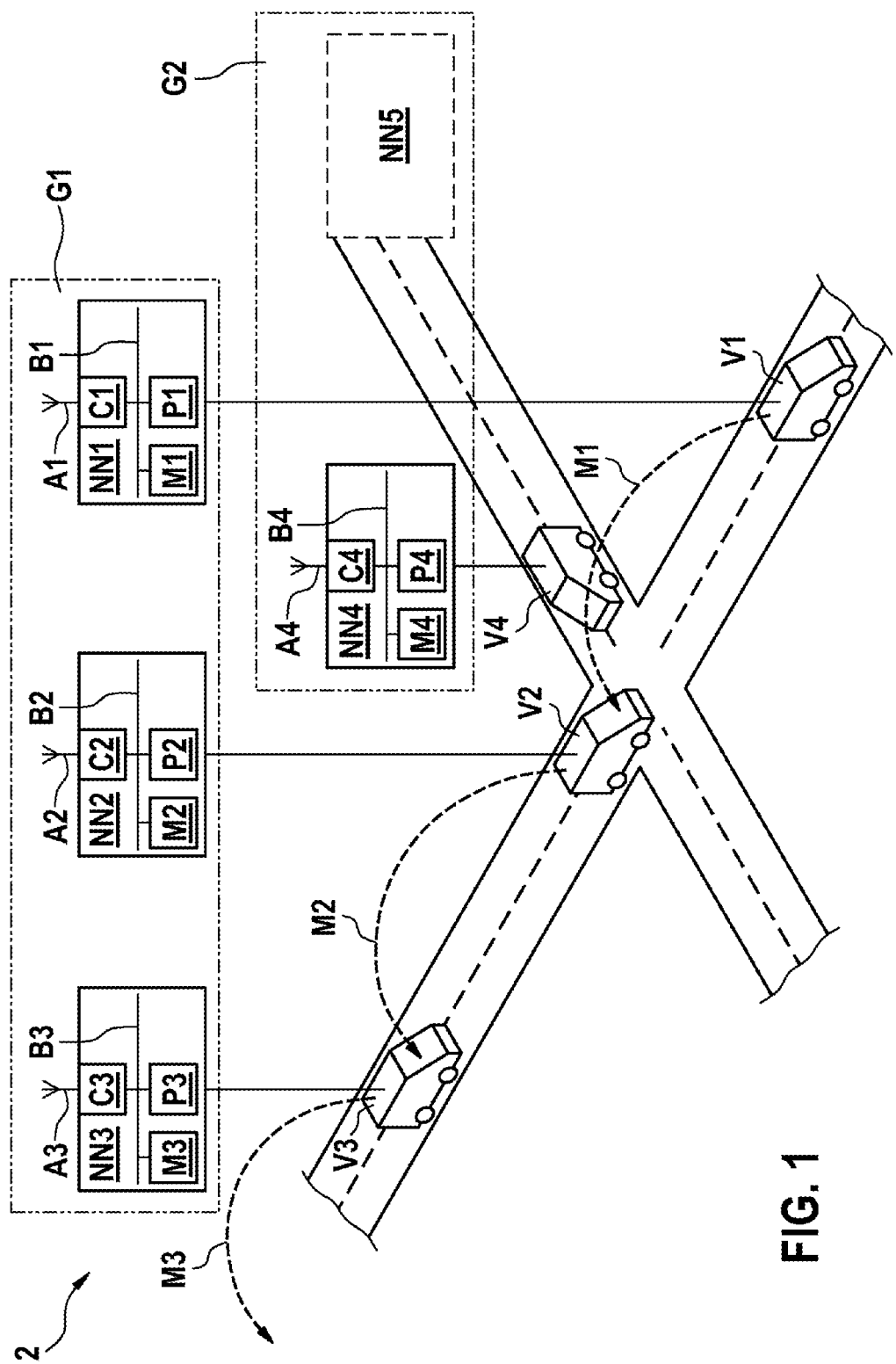
FIG. 1: a schematic illustration of a traffic situation.

FIG. 1 depicts a schematic perspective view of an exemplary traffic situation. Each vehicle V1, V2, V3, V4 comprises an in-vehicle terminal device NN1, NN2, NN3, NN4, which together form a radio communication network 2. The respective motor vehicle V1, V2, V3, V4 is in particular a passenger car or a truck or a truck trailer or a semi-trailer.

Each of the terminal devices NN1, NN2, NN3, NN4 comprises a data bus B1, B2, B3, B4, which connects at least one processor P1, P2, P3, P4, a memory M1, M2, M3, M4, and a radio module C1, C2, C3, C4 with one another. At least one antenna A1, A2, A3, A4 is connected to the radio module C1, C2, C3, C4. The respective radio module C1, C2, C3, C4 is configured to transmit and receive radio signals according to the radio communication network 2, via the antenna A1, A2, A3, A4. A computer program in the sense of a computer program product is stored in the memory M1, M2, M3, M4. The computer program is configured to execute the method steps depicted in this description, in particular with the aid of the at least one processor P1, P2, P3, P4, the at least one memory M1, M2, M3, M4, and the at least one radio module C1, C2, C3, C4, and to communicate with further terminal devices via the at least one antenna A1, A2, A3, A4. Alternatively or in addition, the processor P1, P2, P3, P4 is implemented as an ASIC in order to execute the described method steps.

The radio communication network 2 provides at least one radio channel in terms of radio resources or radio equipment. The in-vehicle terminal devices NN1, NN2, NN3, NN4 form the radio communication network 2 and are configured in accordance with the LTE-V standard, in particular in accordance with "LTE; Evolved Universal Terrestrial Radio Access (E-UTRA); Physical layer procedures (3GPP TS 36.213 version 14.3.0 Release 14)," which is incorporated into this document by reference.

In the depicted traffic situation, the vehicle V1 travels ahead of the vehicle V2, and the vehicle V2 travels ahead of the vehicle V3. The vehicles V1 to V3 form a group G1, in particular a column, a so-called platoon. The motor vehicles V2 and V3 adjust their respective distances from the motor vehicle V1 and V2 driving ahead, for example, autonomously, in order to be able to perform emergency braking without running into the back of the motor vehicle driving ahead. The motor vehicle V4 comprising its terminal device NN4 is part of a group G2 of motor vehicles, wherein another terminal device NN5 in this group G2 is indicated. In the depicted example, a respective message M1, M2 is transmitted from the terminal device NN1, NN2 to the terminal device NN2, NN3 of the immediately following motor vehicle V2, V3. At least the terminal device NN4 is situated in the vicinity of the terminal devices NN1, NN2, and NN3, such that, in the case of a channel access method that is not centrally controlled, for example, in terms of the sidelink mode 4, a decentralized channel access method is used, which will be described in greater detail below.

Figure 2:
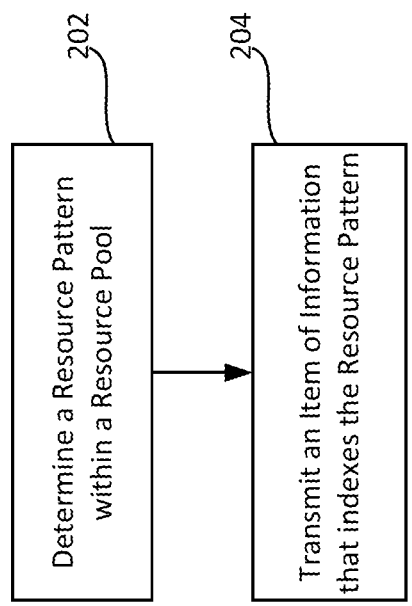

FIG. 2 depicts a schematic flow chart for operating at least one of the in-vehicle terminal devices. According to a step 202, a resource pattern within a resource pool is determined, wherein the resource pattern comprises a plurality of radio resources of a data channel within the resource pool. The resource pool comprises a plurality of physical radio resources, for example, a plurality of subframes and/or a plurality of resource blocks, which are available to the terminal devices for sidelink transmission. The radio resources that are used by the respective terminal device for a specific sidelink transmission are selected from the resource pool by one of the terminal devices in the group, or are allocated to the other terminal devices of the group. Of course, it is also possible for a terminal device not belonging to the group to assume this determination of the resource pattern and/or its distribution in the group.

The resource pool is, for example, received from a V2X control function as part of a V2X (vehicle-to-everything) configuration. Resource pools can thus also be configured individually, for example, by means of respective RRC (radio resource control) signaling for terminal devices that are in an RRC CONNECTED mode.

In another example, the resource pool is preconfigured and stored in the terminal devices, for example, on a SIM card, wherein the preconfigured resource pool is loaded from a memory and thus determined. The preconfigured resource pool is, for example, advantageous in an out-of-coverage case.

Thus, there are several options for determining the resource pool for the in-vehicle terminal device. The resource pool is, for example, reserved for group communication, in particular for communication in a platoon application. In an alternative example, the resource pool is reserved for group communication and other applications; thus, there is a shared use of the resource pool.

According to a step 204, an item of control information that indexes the resource pattern and a group of in-vehicle terminal devices associated with the resource pattern is transmitted on a control channel.

Figure 3:
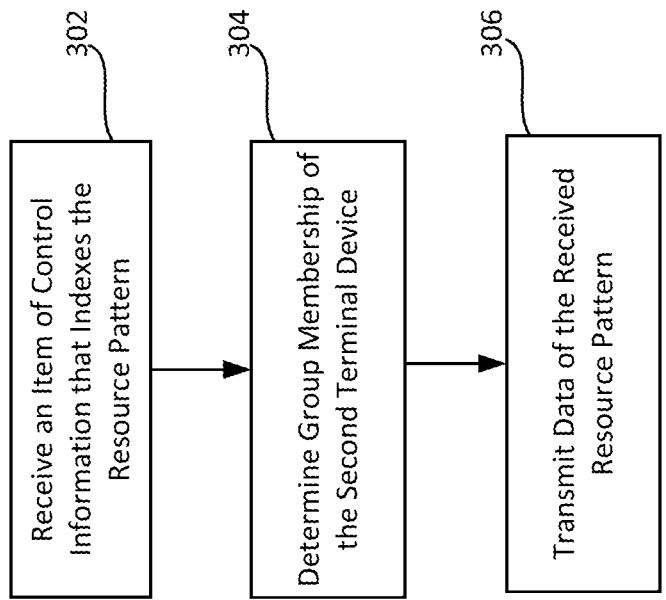
FIGS. 2 and 3: flow charts.

FIG. 3 depicts a schematic flow chart of at least one of the in-vehicle terminal devices. The control information that indexes the resource pattern and the group of in-vehicle terminal devices associated with the resource pattern is received in a step 302 on a control channel, wherein the resource pattern comprises a plurality of radio resources of a data channel within the resource pool. In a step 304, a group membership of the second terminal device in the group of terminal devices is determined. In a step 306, data are transmitted on the data channel via at least one of the radio resources of the received resource pattern, as a function of the determined group membership.

Figure 4:
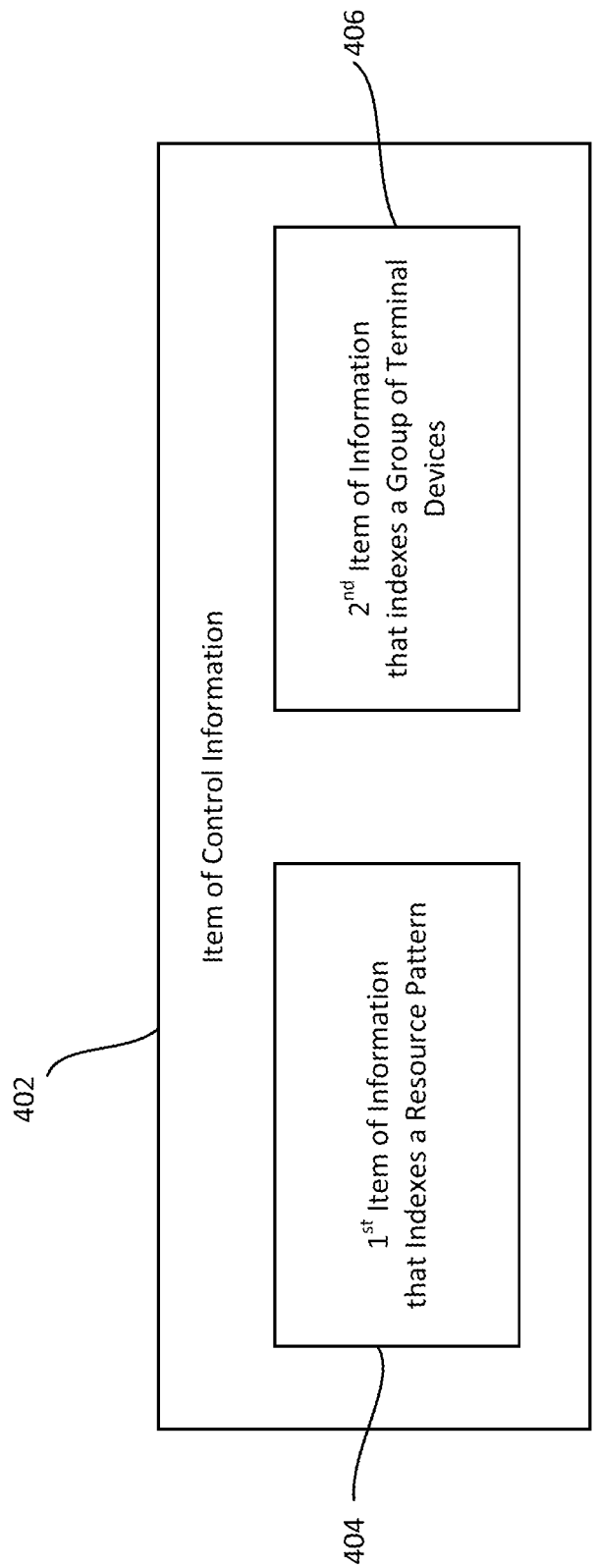
FIG. 4: an item of control information in schematic form.

FIG. 4 depicts a schematic illustration of an item of control information 402 comprising a first item of information 404 that indexes a resource pattern, and a second item of information 406 that indexes a group of terminal devices linked to the resource pattern.

Figure 5:
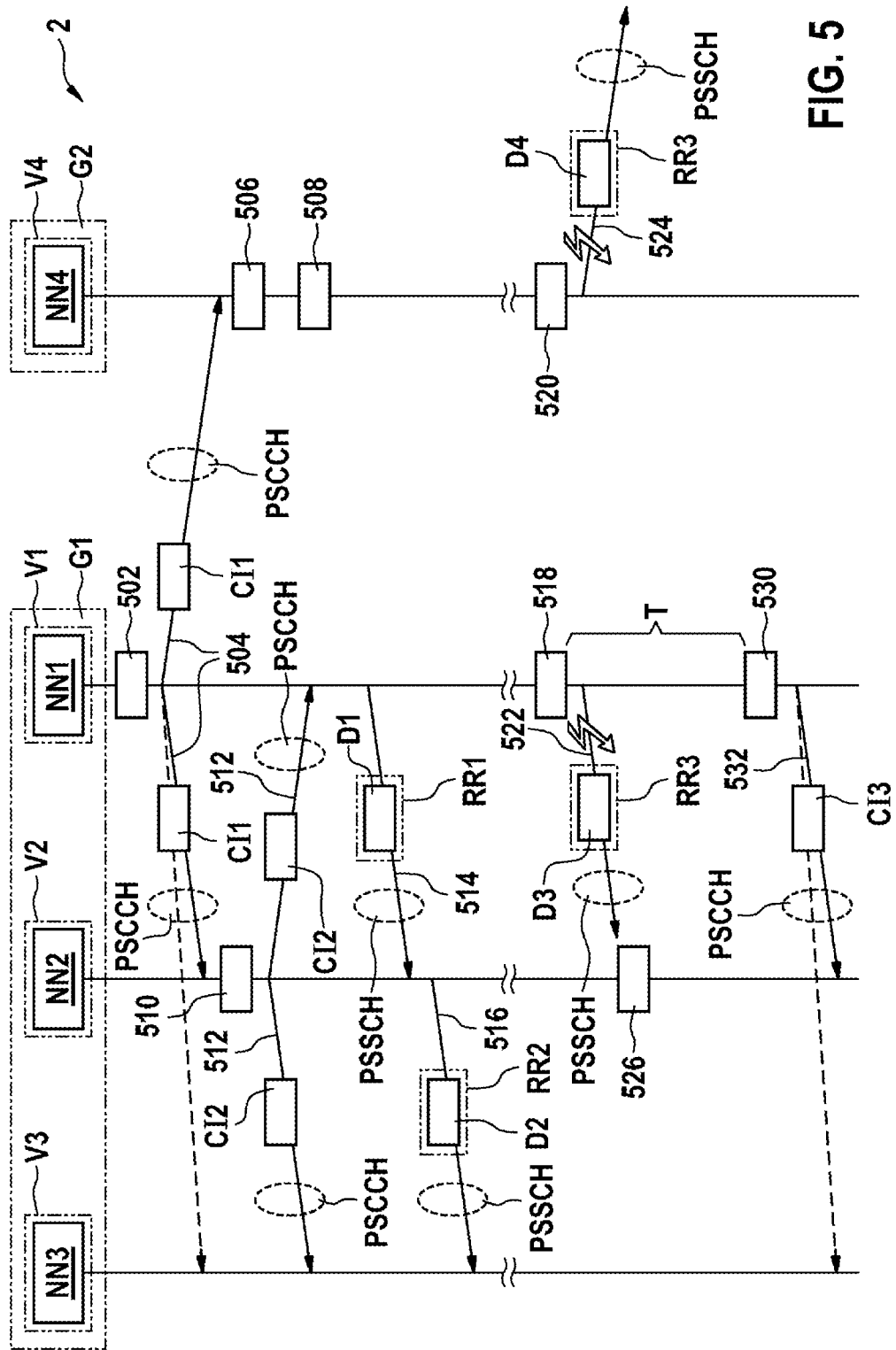
FIG. 5: a schematic sequence diagram.

FIG. 5 depicts a schematic sequence diagram for operating the radio communication network 2. In a step 502, the terminal device NN1 determines the resource pattern within a resource pool, wherein the resource pattern is to be used by the group G1. The resource pattern for the group G1 comprises the radio resources RR1, RR2. In step 504, the corresponding control information CI1 is transmitted from the terminal device NN1 via the control channel PSCCH.

In a step 506, the terminal device NN4 determines that the group G1 transmitted via the control information CI1 is different from the group G2, to which the terminal device NN4 belongs. Correspondingly, in step 508, all radio resources that are included in the communicated resource pattern are disabled for transmission by the terminal device NN4.

In a further example, the terminal device NN4 is not necessarily part of a group of terminal devices. In one example, in step 506, the terminal device NN4 transmits, in a form not depicted, an additional item of control information that indexes radio resources used by the in-vehicle terminal device NN4, and determines that the in-vehicle terminal device NN4 is not part of the group G1 of at least two in-vehicle terminal devices, and that a portion of the low-priority radio resources used by the terminal device NN4 is included in the resource pattern. The radio resources used by the in-vehicle terminal device NN4 have a lower priority than the radio resources of the resource pattern transported in the control information CI1 and belonging to the group G1. A low priority of a radio resource is characterized in that, when using radio resources, terminal devices that are part of a group take preference over terminal devices that are not part of a group. As a function of the lack of group membership and as a function of the low-priority radio resources that are included in the received resource pattern, in step 508, the correspondingly identified portion of the radio resources used by the second terminal device NN4 are not used, or these radio resources are disabled for use by the terminal device NN4.

After receipt of the control information CI1, in a step 510, the terminal device NN2 determines that the radio resources RR1 and RR2 are reserved exclusively for use by the terminal devices of the group G1. Thus, in step 510, the group membership of the terminal device NN2 in the group G1 is determined. If the terminal device NN2 detects no collisions on the radio resources RR1, RR2 of the resource pattern, and if the group membership is positively determined, in a step 512, the terminal device NN2 transmits control information CI2 on the control channel PSCCH.

In a step 514, the terminal device NN2 receives data D1 via the radio resource RR1 of the data channel PSSCH. In a step 516, the terminal device NN2 transmits data D2 via the radio resource RR2 of the resource pattern received or indexed in step 504.

In steps 518 and 520, the terminal devices NN1 and NN4 determine a respective resource pattern from a shared resource pool, independently of one another, wherein a radio resource RR3 is randomly reserved exclusively for use in the two groups G1, G2. When transmitting data D3, D4 via the radio resources RR3 in steps 522 and 524, a collision occurs, which is identified by the terminal device NN2 in a step 526. In step 526, the transmission of control information CI by the terminal device NN2 is prevented. The terminal device NN1, which is responsible for assigning resource patterns, expects the receipt of control information CI within a time period T. The absence of this control information CI over the time period T is detected by the terminal device NN1 in step 530, and the terminal device NN1 determines a new resource pattern which, at least as far as the radio resource RR3 is concerned, is disjoint to the resource pattern determined in step 518. In a step 532, the new resource pattern is transmitted by means of an item of control information CI3.

The control information CI1, CI2, CI3 is an item of sidelink control information, SCI, and is transmitted via the control channel, for example, the physical sidelink control channel, PSCCH. The data channel is, for example, the physical sidelink shared channel, PSSCH. The data channel and the control channel are respectively a physical radio channel comprising a radio frequency and/or a time period.

Figure 6:
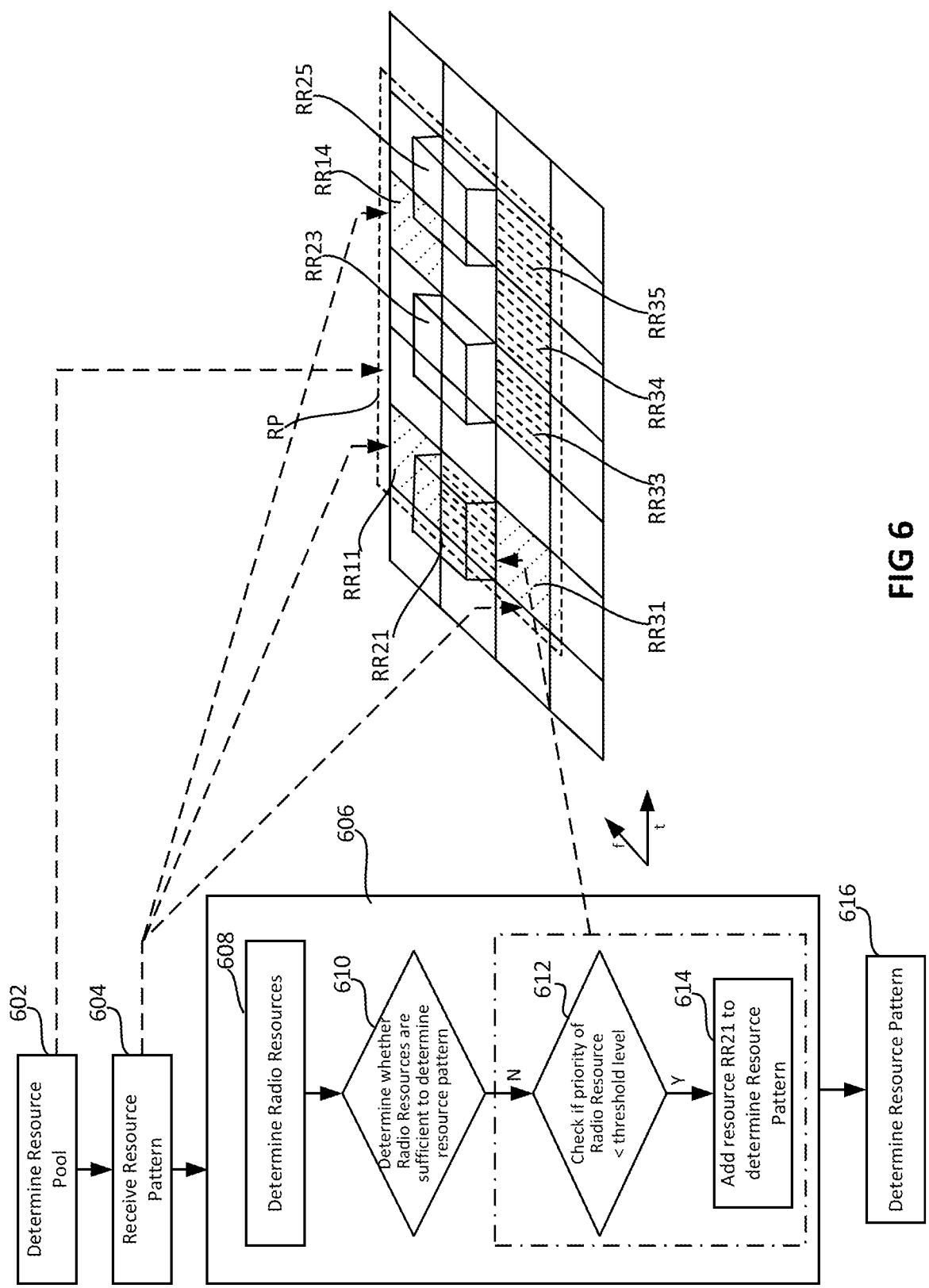
FIG. 6: a sequence and time-frequency diagram.

FIG. 6 depicts a schematic combined flow diagram and radio resources diagram, which is used for explaining steps 502, 518, 520, 530 from FIG. 5. The depicted steps are used to operate the terminal device that makes the decentralized reservation of radio resources for the respective group of terminal devices.

In step 602, the resource pool RP, which comprises a plurality of radio resources, is determined. In a step 604, at least one resource pattern of another group of terminal devices is received. Since the radio resources used by the other group of terminal devices is not to be used by the present group of terminal devices, these radio resources RR11, RR14, and RR31 are excluded, i.e., not used, when determining the resource pattern for the present group of terminal devices.

In a step 606, it is checked whether potentially occupied radio resources are possible for determining the resource pattern for the present group, i.e., are candidates for determining the resource pattern. In a step 608, a plurality of radio resources RR21, RR33, RR34, RR35 that are potentially occupied by low-priority traffic are determined, for example, by means of a sensing mechanism. As a result, in step 606, potentially free radio resources of the resource pool RP are determined, which are depicted in the present example without hatching. In particular, in the case of a vehicle that is driving ahead in the platoon, the platoon leader, it is advantageous to operate the sensing mechanism, since the platoon leader can potentially determine free radio resources first, due to its position.

In a step 610, it is determined whether the potentially free radio resources determined in steps 602, 604, and 608 are sufficient to determine the at least one resource pattern, wherein, for example, the group configuration of the group is taken into consideration. If this is not the case, in a step 612, it is checked whether a priority of the utilized radio resource RR21 falls below a threshold value. If this is the case, in step 614, the resource RR21 is added to the potential candidates for determining the resource pattern. Steps 612 and 614 are carried out for one respective radio resource.

In a step 616, at least one resource pattern is determined as a function of the configuration of the present group, for example, as a function of the plurality of terminal devices in the group or the estimated need for communication, and as a function of the determined potentially free radio resources.

For example, the group G1 from FIG. 1 comprises a plurality of three terminal devices NN1, NN2, NN3. In order, for example, to perform hop-by-hop communication, a plurality of three radio resources that are sequential but spaced over time is needed in order to enable the processing of the respective message in the respective terminal device by means of the time spacing. The resource pattern is correspondingly determined from the resource pool RP according to step 616. The radio resource RR21 is potentially occupied. However, since it is determined in step 610 that the free radio resources are not sufficient to determine the resource pattern, in step 614, the radio resource RR21 is selected as a potential candidate. Corresponding to the configuration of the present group, the radio resources RR21, RR23, and RR25 are determined as a resource pattern in step 616. The propagation of the determined resource pattern to the adjacent terminal devices makes it possible for the adjacent terminal devices to refrain from using the radio resources RR21, RR23 and, RR25, and thus, an exclusive reservation of these radio resources RR21, RR23, and RR25 of the resource pattern is achieved for the present group of terminal devices. The depicted selected radio resources RR21, RR23, and RR25 are chosen in the same frequency range only by way of example, but may of course also be chosen in frequency ranges that are respectively different from one another.

The invention claimed is:

1. A first in-vehicle terminal device (NN1; NN2, NN3; NN4) for a radio communication network, wherein the first in-vehicle terminal device (NN1; NN2, NN3; NN4) comprises at least one processor, at least one memory comprising computer program code, at least one communication module, and at least one antenna, wherein the computer program code is configured in such a way that, via the at least one processor, the at least one communication module, and the at least one antenna, it causes the first in-vehicle terminal device (NN1; NN2, NN3; NN4):

to determine a resource pattern within a resource pool, wherein the resource pattern comprises a plurality of radio resources of a data channel within the resource pool, to transmit an item of control information that indexes the resource pattern and a group (G1; G2) of at least two in-vehicle terminal devices (NN1, NN2, NN3; NN4) associated with the resource pattern, on a control channel, to determine potentially usable radio resources for the group (G1; G2) of at least two in-vehicle terminal devices (NN1, NN2, NN3; NN4), said resources representing transmission opportunities within the radio resources of the data channel indexed by the resource pool, to determine the resource pattern from the plurality of potentially usable radio resources, to receive a different item of control information that indexes a further resource pattern and a group (G1; G2) of at least two terminal devices (NN1, NN2, NN3; NN4) associated with the further resource pattern, on the control channel, wherein the further resource pattern comprises a plurality of radio resources of the data channel within the resource pool, and to determine the plurality of potentially usable radio resources as a function of the further resource pattern, wherein the plurality of potentially usable radio resources and the radio resources of the further resource pattern do not overlap.

2. The first in-vehicle terminal device (NN1; NN2, NN3; NN4) as claimed in claim 1, wherein the first in-vehicle terminal device (NN1; NN2, NN3; NN4):

determines a respective occupancy status of the radio resources of the resource pool, and determines the plurality of potentially usable radio resources as a function of the determined occupancy statuses, wherein the plurality of potentially usable radio resources is not occupied by other in-vehicle terminal devices.

3. The first in-vehicle terminal device (NN1; NN2, NN3; NN4) as claimed in claim 2, wherein the first in-vehicle terminal device (NN1; NN2, NN3; NN4) is associated with a first vehicle (V1, V2, V3; V4).

4. The first in-vehicle terminal device (NN1; NN2, NN3; NN4) as claimed in claim 1, wherein the first in-vehicle terminal device (NN1; NN2, NN3; NN4):

determines a respective priority of radio resources of the resource pool that are used, and determines the plurality of potentially usable radio resources as a function of the determined priorities.

5. The first in-vehicle terminal device (NN1; NN2, NN3; NN4) as claimed in claim 1, wherein the first in-vehicle terminal device (NN1; NN2, NN3; NN4) is associated with a first vehicle (V1, V2, V3; V4).

6. A first vehicle terminal (NN1; NN2, NN3; NN4) for a radio communication network, wherein the first in-vehicle terminal device (NN1; NN2, NN3; NN4) comprises at least one processor, at least one memory comprising computer program code, at least one communication module, and at least one antenna, wherein the computer program code is configured in such a way that, via the at least one processor, the at least one communication module, and the at least one antenna, it causes the first in-vehicle terminal device (NN1; NN2, NN3; NN4):

to determine a resource pattern within a resource pool, wherein the resource pattern comprises a plurality of radio resources of a data channel within the resource pool, to transmit an item of control information that indexes the resource pattern and a group (G1; G2) of at least two in-vehicle terminal devices (NN1, NN2, NN3; NN4) associated with the resource pattern, on a control channel, to determine an absence of a reception of further control information that indexes the determined resource pattern and a group X (G1; G2) of at least two in-vehicle terminal devices associated with the determined resource pattern, to determine a further new resource pattern within the resource pool as a function of the determined absence, wherein the further resource pattern comprises a plurality of radio resources of the data channel within the resource pool, and to transmit a further item of control information on the control channel that comprises the further new resource pattern and the group of at least two in-vehicle terminal devices associated with the new resource pattern.

7. The first in-vehicle terminal device (NN1; NN2, NN3; NN4) as claimed in claim 6, wherein the first in-vehicle terminal device (NN1; NN2, NN3; NN4) is associated with a first vehicle (V1, V2, V3; V4).

8. A second in-vehicle terminal device (NN2; NN3, NN4; NN1) for a radio communication network, wherein the second in-vehicle terminal device (NN2; NN3, NN4; NN1) comprises at least one processor, at least one memory comprising computer program code, at least one communication module, and at least one antenna, wherein the computer program code is configured in such a way that, via the at least one processor, the at least one communication module, and the at least one antenna, it causes the second in-vehicle terminal device (NN2; NN3, NN4; NN1):

to receive an item of control information, from a first in-vehicle terminal device, that indexes a resource pattern and a group (G1; G2) of at least two in-vehicle terminal devices associated with the resource pattern, on a control channel, wherein the resource pattern comprises a plurality of radio resources of a data channel within the resource pool;

to determine a group membership of the second terminal device (NN2; NN3, NN4; NN1) in the group (G1; G2) of at least two terminal devices;

to transmit data on the data channel via at least one of the radio resources of the received resource pattern, as a function of the determined group membership, to transmit an additional item of control information that indexes radio resources used by the second in-vehicle terminal device (NN4), wherein the radio resources used by the second in-vehicle terminal device (NN4) have a lower priority than the radio resources of the resource pattern; and to determine that the second in-vehicle terminal device (NN4) is not part of the group (G1) of at least two in-vehicle terminal devices, and that a portion of the radio resources used by the second terminal device (NN4) having lower priority is included in the resource pattern, and as a function thereof, does not use the portion of the radio resources used by the second terminal device (NN4) having lower priority, which are not included in the resource pattern.

9. The second in-vehicle terminal device (NN2; NN3, NN4; NN1) as claimed in claim 8, wherein the second in-vehicle terminal device (NN2; NN3, NN4; NN1):

determines that the second in-vehicle terminal device (NN2; NN3, NN4; NN1) is part of the group of at least two in-vehicle terminal devices, and as a function thereof, and transmits another item of control information that indexes the received resource pattern and the group of at least two in-vehicle terminal devices associated with the received resource pattern, on the control channel.

10. The second in-vehicle terminal device (NN2; NN3, NN4; NN1) as claimed in claim 8, wherein the second in-vehicle terminal device (NN2; NN3, NN4; NN1) is associated with a second vehicle (V2, V3, V4, V1).

11. The second in-vehicle terminal device (NN2; NN3, NN4; NN1) as claimed in claim 8, wherein the second in-vehicle terminal device (NN2; NN3, NN4; NN1) is associated with the group (G1; G2) of at least two terminal devices, and wherein the second in-vehicle terminal device (NN2; NN3, NN4; NN1):

determines a collision on a radio resource of the resource pattern, and stops transmission of other control information as a function of the determined collision.

12. The second in-vehicle terminal device (NN2; NN3, NN4; NN1) as claimed in claim 11, wherein the second in-vehicle terminal device (NN2; NN3, NN4; NN1) is associated with a second vehicle (V2, V3, V4, V1).

13. The second in-vehicle terminal device (NN2; NN3, NN4; NN1) as claimed in claim 8, wherein the second in-vehicle terminal device (NN2; NN3, NN4; NN1) is associated with a second vehicle (V2, V3, V4, V1).

* * * * *